United States Patent [19]

Cinque et al.

[11] 4,040,717
[45] Aug. 9, 1977

[54] PROJECTION SCREEN FOR OPTICAL IMAGES

[76] Inventors: Alphonse P. Cinque, 65 Earle Ave.; Mark G. Cinque, 15 Elm St., both of Lynbrook, N.Y. 11563

[21] Appl. No.: 635,696

[22] Filed: Nov. 26, 1975

[51] Int. Cl.² ............................................. G03B 21/60
[52] U.S. Cl. .................................... 350/127; 350/129
[58] Field of Search ................................ 350/127–129

[56] References Cited
U.S. PATENT DOCUMENTS

| | | | |
|---|---|---|---|
| 2,107,038 | 2/1938 | Lennard | 350/129 X |
| 2,480,031 | 8/1949 | Kellogg | 350/127 |
| 2,870,673 | 1/1959 | Schwesinger | 350/128 |
| 3,263,561 | 8/1966 | Jackson | 350/129 X |
| 3,712,708 | 1/1973 | Brown | 350/129 |

*Primary Examiner*—Richard A. Wintercorn
*Attorney, Agent, or Firm*—Edward H. Loveman

[57] ABSTRACT

An optical projection screen comprises a sheet having a rectangular array of small concavities of equal depth on one face. The concavities may be square and arranged in horizontal rows and vertical columns. Each concavity may have four contiguous right triangular sections with alternate sections in each concavity cylindrically curved on mutually perpendicular horizontal and vertical axes. The screen may be opaque, matte white or silvered for reflecting images, or translucent for projecting transmitted images. The screen provides uniform intensity or illumination of images at all points in a conical viewing core around a projection axis perpendicular to the screen.

10 Claims, 13 Drawing Figures

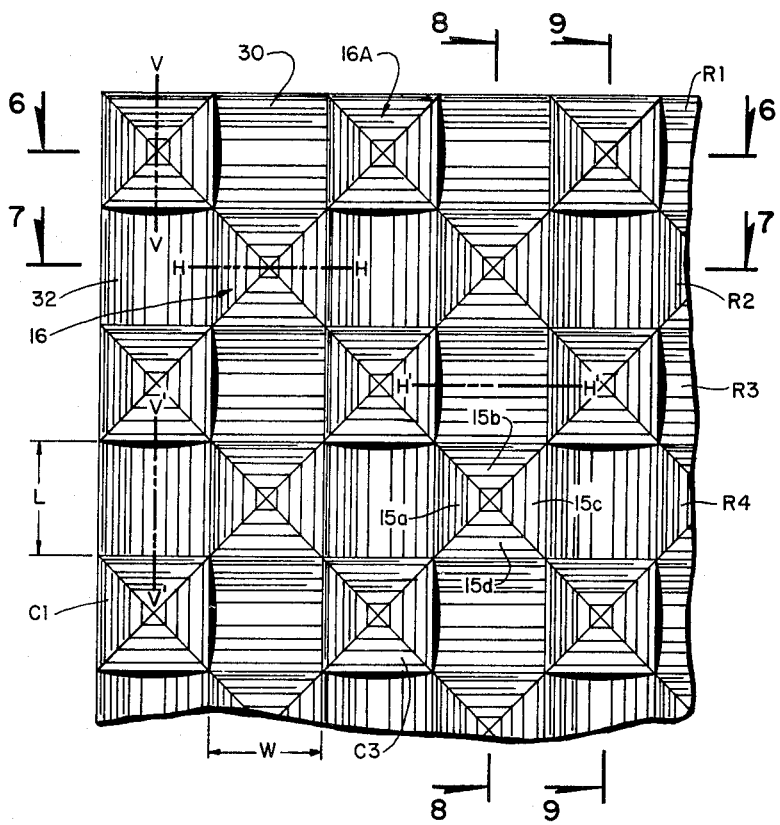
FIG. 5
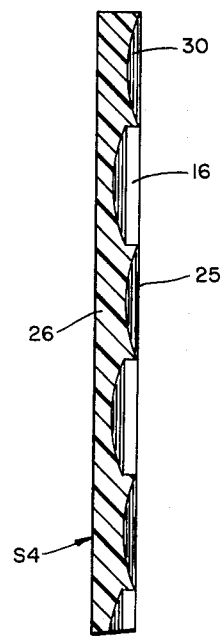
FIG. 8
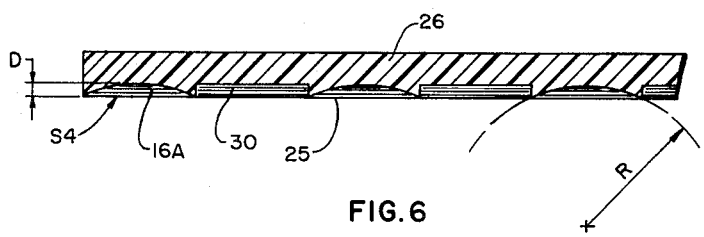
FIG. 6
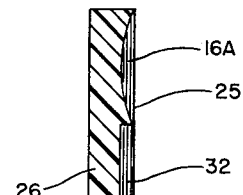
FIG. 7
FIG. 9
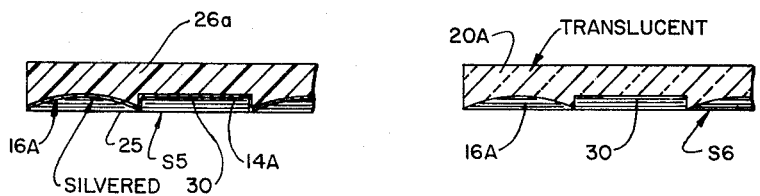
FIG. 10
FIG. 11

PROJECTION SCREEN FOR OPTICAL IMAGES

This invention relates to the art of reflective screens for optical image projection, and more particularly concerns reflective screens for optical projection having improved reflective surfaces.

Conventional screen used for viewing motion pictures and slides are generally viewable with a conical viewing core of 90° that is 45° on each side of a projection axis, in both vertical and horizontal planes. Viewing outside of this core is normally not satisfactory due to loss of picture brightness and fine definition. Originally matte white screen surfaces were used which were inherently poor reflectors in that as much as one-half the incident light was lost.

In order to provide optimum picture brightness and definition, various expedients have been proposed. For example, beaded screens have been devised which diffuse light according to a general pattern. However, in order to provide random reflection effects, the beads must be irregularly positioned on the screen surface, but since each beam causes chromatic aberration of light impinging thereon, the color values are distorted and the images diffused. The total effect is to afford poor spectral division of reflected light. Moreover, glass-beaded screens must be mounted and handled very carefully, because the beads tend to fall off the flexible base material of the screens if they are jarred, dropped or scratched. In addition, cleaning is difficult since cleaning agents leave films in interstices and these films cannot be washed out without causing dulling and loss of relfectance. Another object is the occurrence of "dead spots" and "hot spots" i.e. points of non-reflection and concentrated brilliant reflection respectively which results in image distortions.

Other screens have been devised having plastic coatings on flexible backings. The coatings have integrally molded plastic convex lens structures. These lenticular screens lack uniformity of illumination and inefficient return of reflected light. A loss of approximately one-third of the impinging light is generally experienced. Some screens use woven materials, others are translucent, still others have smooth silver surfaces, and others have lenticular silver surfaces. All of these prior art screens are in compliance with Lambert's Law of Reflection and Transmittance and have the characteristic of rapidly decreasing sharpness of images as viewing angles increase with respect to the projection axis. Some cannot be used in rooms that are not darkened.

The present invention is directed at overcoming the above and other difficulties and disadvantages of prior image projection screens. According to the invention, the base screen structure may be rigid or flexible, and may be translucent or opaque. The screen surface may be a molded plastic coating having a cylindrically curved concave lens formation arranged in uniform rectangular arrays. Each lens formation or concavity may be square and may have four triangular sections. Alternate concavities may have a single section. This invention makes it possible to provide screens which widen the conical core of image viewing to approximately 120° in both vertical and horizontal planes as compared with the conventional maximum viewing angle of 90°. The images viewed at the extreme angles, appears as bright as they do along the axis of projection and hot spots and dead spots are avoided so images appear bright and uniformly lighted throughout, whereby, viewer eye fatigue is reduced to negligible amounts. Screens made in accordance with the invention may be used in areas of normal or even high ambient light. They may be rolled, washed, spliced, are not attacked by fungi or bacteria and can be manufactured at relatively low cost and have longer useful lives than conventional screens.

It is therefore a principal object of the invention to provide a front or rear projection screen which will return a projected image that is uniformly bright and clear even under conditions of strong ambient light, to viewers located anywhere within an extended viewing core.

A further object of the present invention is to provide an image projection screen which has no dead spots and not hot spots.

Another object of the present invention is to provide an image projection screen which compensates for Lambert's Laws of Reflection or by Transmittance by including a rectangular array of concave cylindrical lens formations so arranged that the amplitude of reflected or transmitted light does not diminish as the viewing angle with respect to the axis of projection increases.

Another object of the present invention is to provide an image project screen which provides equal uniform image illumination from all viewing angles up to 120° in horizontal and vertical planes, for both color and black and white images.

These and other objects and many of the attendant advantages of this invention will be readily appreciated as the same becomes better understood by reference to the following detailed description when considered in connection with the accompanying drawings in which:

FIG. 5 is a front elevational view of a highly magnified part of still another projection screen embodying the invention;

FIG. 6 is a horizontal cross sectional view taken along line 6—6 of FIG. 5;

FIG. 7 is a horizontal cross sectional view taken along line 7—7 of FIG. 5;

FIG. 8 is a vertical sectional view taken along line 8—8 of FIG. 5;

FIG. 9 is a vertical sectional view taken along line 9—9 of FIG. 5;

FIG. 10 is a fragmentary cross sectional view similar to part of FIG. 6 showing another screen construction;

FIG. 11 is a fragmentary cross sectional view similar to part of FIG. 6 showing still another screen construction.

Figure 1:
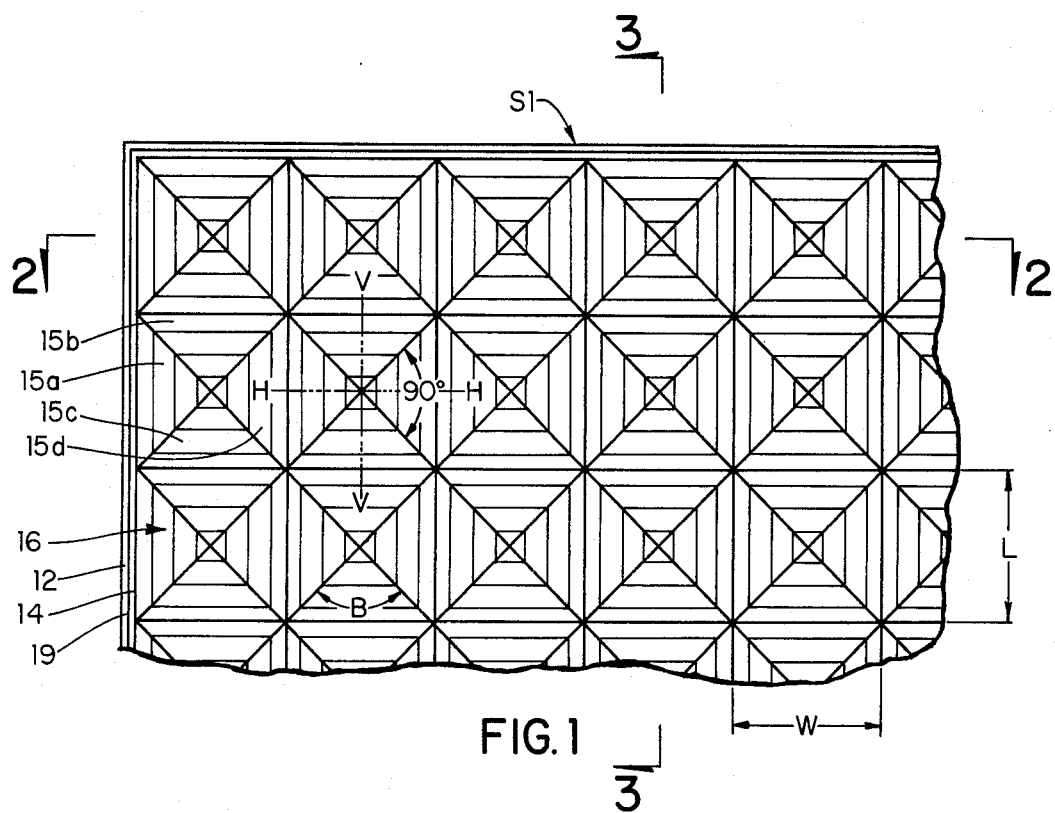
FIG. 1 is an obligue, highly magnified, front elevational view of a part of a projection screen embodying the invention.
Figure 2:
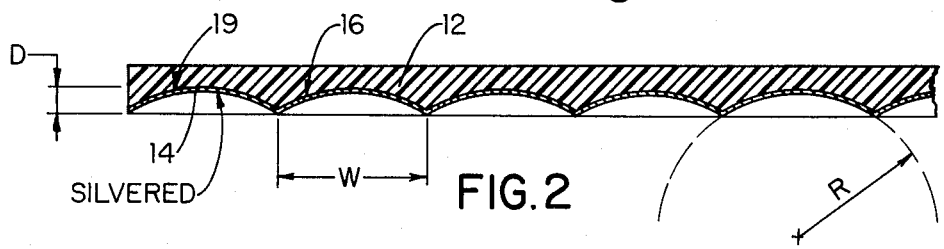
FIG. 2 is a horizontal cross sectional view taken along line 2—2 of FIG. 1.
Figure 3:
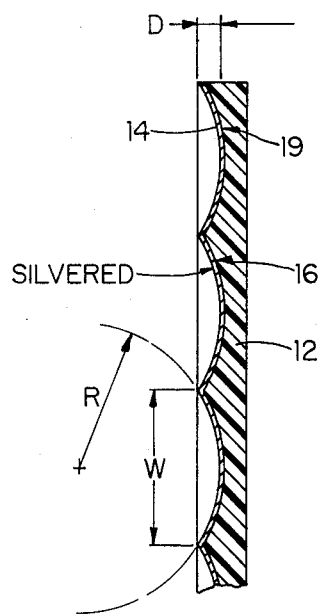
FIG. 3 is a vertical cross sectional view taken along line 3—3 of FIG. 1.

Referring now to the drawings wherein like reference characters designate like or corresponding parts throughout, there is illustrated in FIGS. 1, 2, and 3, a corner section of a screen S1 which has a flexible opaque backing sheet 12 and may be manufactured of a plastic sheet such as vinyl. Applied to the front face of the backing sheet 12 is a thin, shiny silvery coating 14. Molded into the front face 19 of the backing sheet is an array of concavities 16. The coating 14 conforms to the concavities and is very highly reflective to impinging light rays. Each concavity has four sides and has four triangular sections 15a, 15b, 15c, and 15d, apically and laterally continguous to form a quadrangle. Lateral sections 15a and 15d are cylindrically curved with respect to a vertical axis V—V (FIG. 2). Upper and lower sections 15b, 15c are cylindrically curved with respect to a horizontal axis H—H (FIG. 3). Adjacent triangular sections are axially oriented 90° apart on axes H—H and V—V. When the radius of curvature of upper and lower sections 15B and 15C is equal to the radius of curvature of the lateral sections 15A and 15D, then all the sides of the concavity are equal and each triangular section is a right angle and the concavity is a square.

Figure 12:
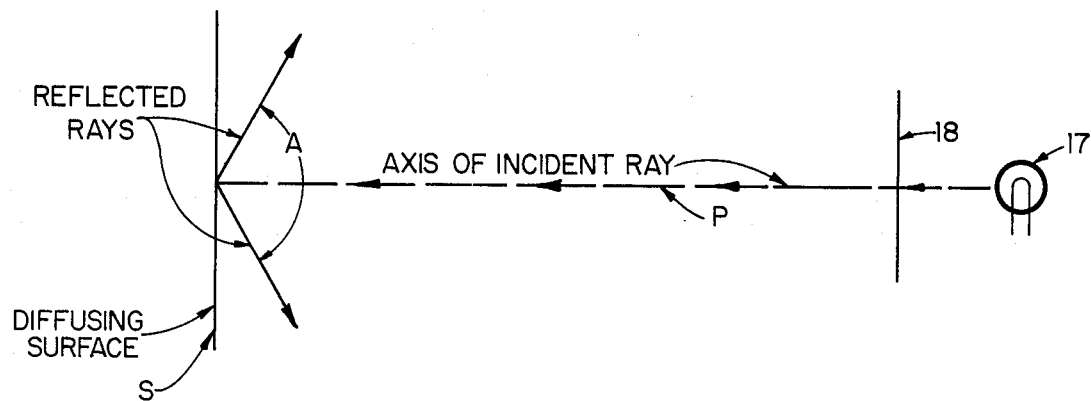
FIG. 12 is a graphic diagram used in explaining the invention.

Screen S1 operates in a manner indicated graphically in FIG. 12. Here the flat vertical screen surface S receives incident rays from a projection lamp 17 to provide an image through optical film 18. Axis P is the axis of projection perpendicular to screen surface S. The screen surface S is assumed to have an array of cylindrical concavities as shown in FIGS. 1, 2, and 3. The viewing core defines a solid cone having an apical angle A which may be as much as 120° with the axis P coincident with the horizontal and vertical central axis of the cone. At all points in all viewing planes (horizontal and vertical) including axis P and bisecting the conical viewing cone, the intensity of reflected rays is uniform and substantially equals the intensity of incident illuminating rays. This apparent anomaly which appears to contradict Lambert's Laws of Reflection and Transmittance is explained by the fact that the concavities uniformly reflect in all directions. The array of concavities effectively compensates the decrease in reflectance which would otherwise occur at increasing angles from axis P, in compliance with Lambert's Law of Reflection. The formation of the lens concavities are such that the screen reflects into a given observation field as defined by the horizontal and vertical viewing angles. The lens concavities may be arranged such that the field angles differ in the horizontal and vertical directions.

Figure 4:
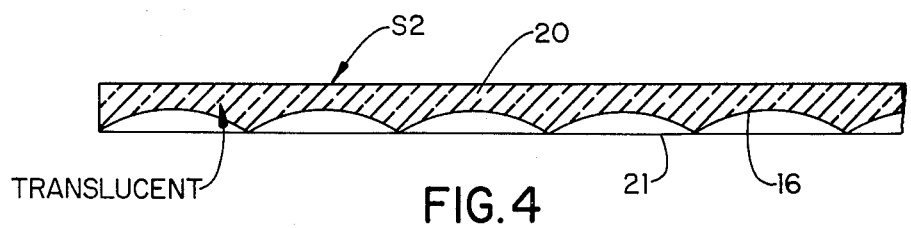
FIG. 4 is a view similar to FIG. 2 showing another screen construction.

FIG. 4 shows a translucent screen S2 having a translucent glass or plastic body 20. A face 21 is formed with the rectangular array of cylindrically curved concavities 16 identical in configuration to the concavities shown in FIG. 1. This screen may be used for transmission or rear projection where the projection lamp is at one side of of the screen and the conical viewing core is at the other side. The screen S2 operates analogously to that of screen S1. Lambert's Law Transmittance applies; however, the screen operates to transmit light uniformly at all viewing angles (horizontal and vertical), and compensates for increasing loss in transmitted light which would otherwise occur at increasing viewing angles with respect to the axis or projection.

Figure 4A:
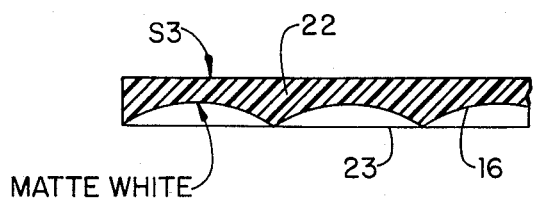
FIG. 4A is a fragmentary horizontal cross sectional view similar to a part of FIG. 4 showing a further screen construction.

FIG. 4A shows a reflecting type of screen S3 having an opaque body 22 with a matte white face 23 formed with the concavities 16 disposed in a rectangular array identical to that shown in FIG. 1. This screen operates to reflect incident projected light uniformly at all viewing angles within the conical viewing core, as explained above in connection with FIG. 2.

FIGS. 5-9 show another projection screen S4 having another rectangular array of cylindrical concavities 16, 16A formed in the face 25 of the opaque sheet 26 with each of the concavities 16, 16A having four contiguous right triangular sections 15a-15d defining a square. In this embodiment the concavities 16 are disposed in alternate rows R2, R4, etc., while the concavities 16A are disposed in alternate rows R1, R3, etc. The concavities 16A are alternately disposed with the concavities 30 and the concavities 16 are alternately disposed with the concavities 32. The concavities 30 have single sections cylindrically curved on a horizontal axes H–H' whereas the concavities 32 have single sections cylindrically curved on a vertical axes V-V'. The concavities 16 are recessed inwardly of the face 25 a short distance equal to the depth of the concavities 32 (FIGS. 7 and 8) and then have a curvature equal to the depth D. The sections 15a-15d of the concavities 16 and 16A are curved on horizontal and vertical axes H—H and V—V respectively which are parallel to the plane 25 of the sheet 26. The concavities 30 appear on alternate horizontal rows R1, R3, etc., and columns C2, C4, etc., alternating with concavities 16A in the rows. The concavities 32 appear on alternate horizontal rows R2, R4, etc., and columns C1, C3, etc., alternating with the cavities 16 in those rows. Thus laterally of each of the concavities 16 and 16A are either in the concavities 30 or 32, and above and below each of the concavities on 16A are either the concavities 32 or 30.

By this arrangement described, the rectangular array of concavities has:
- 25% crossed horizontal and vertical axes of curvature (concavities 16A);
- 25% horizontal and vertical axes of curvature crossed in recessed planes (concavities 16);
- 25% vertical axes of curvature (concavities 32);
- 25% horizontal axes of curvature (concavities 30).

The face of the sheet 26 may be matte white or shiny and highly reflective. FIG. 10 shows a screen S5 having face 25A of a flexible, opaque sheet 26a covered by a highly reflective silvered coated 14A.

FIG. 11 shows a screen S6 having a translucent body 20A. Screens S5 and S6 have concavities 16, 16A, 30 and 32 diposed in rectangular array identical to that shown in FIG. 4.

It is preferable that the dimensions of the concavities 16 and 16A of a screen having a conical core viewing angle of 120° in both the horizontal and vertical plane be 0.020 in both width and length and that the depth of these concavities equal to 0.002. The radius of curvature for the foregoing concavities should be 0.020 . By varying the foregoing dimensions, including the radius, it is possible to construct a variety of field of observations. For example, to obtain a 90° horizontal field and a 60° vertical viewing field, the radius of curvature of the lateral sections 15A and 15D, and the upper and lower sections 15B and 15C would be 0.0261 and 0.0380 respectively.

For the aforementioned conical core viewing angle of 120°, both in the horizontal and vertical plane, the concavities 30 and 32 have the same curvature as the concavities 16 and 16A and a depth of 0.002. The concavities 16 have a total depth D' comprised of a recess depth, and a curvature depth. It is preferable that the recessed depth equal the curvature depth whereby D' is equal to 2D or 0.004. It has been determined that these dimensions provide optimum optical results. The screens S4 and S5 operate in the same manner as described for reflective screen S1 above, to compensate for Lambert's Law of Reflection whereas the translucent screen S6 operates in the same manner as the transmissive screen S2 to compensate for Lambert's Law of Transmittance.

All the projection screens described have the following desirable features:

1. They may be viewed at all angles in a prescribed conical viewing core with equal intensity of image illumination.
2. The viewing core may have a maximum opical angle of approximately 120°.
3. The screens reflect and transmit with substantially no visible dead spots and hot spots.
4. The screens are light in weight, and long lasting.
5. The screens may be manufactured at relatively low lost cost.

It should be understood that the foregoing relates to only a limited number of preferred embodiments of the invention, which have been by way of example only, and that it is intended to cover all changes and modifications of the examples of the invention herein chosen for the purposes of the disclosure which do not constitute departures from the spirit and scope of the invention.

The invention claimed is:

1. A projection screen, comprising:
   a sheet for receiving optical images projected thereon, said sheet having a face formed with a rectangular array of contiguous concavities disposed in horizontal rows and vertical columns, at least alternate concavities in each of said horizontal rows having four triangular sections apically and laterally contiguous to form a quadrangle so that the intensity of images transmitted from said face have substantially equal illumination intensity at all viewing points within a conical viewing core, where the axis of said core is coincident with the axis of optical projection.

2. A projection screen as defined in claim 1, wherein said conical viewing core has an apical angle of approximately 120°.

3. A projection screen as defined in claim 1, wherein each of said concavities is square; and wherein each of said concavities is approximately 0.020 inches in length and width.

4. A projection screen as defined in claim 1, wherein said sheet is opaque.

5. A projection screen as defined in claim 1, wherein said sheet is translucent.

6. A projection screen as defined in claim 1, wherein said sheet is coated with a silvered, highly reflective coating.

7. A projection screen as defined in claim 2, wherein each of said concavities has four cylindrically curved sections, alternately curved on mutually perpendicular axes.

8. A projection screen as defined in claim 7, wherein each of said concavities is square and approximately 0.020 inches in length and width, and approximately 0.002 inches in depth.

9. A projection screen as defined in claim 1, wherein a first 25% of said concavities have four sections alternately cylindrically curved on mutually perpendicular horizontal and vertical axes parallel to the plane of said face, a second 25% of said concavities each having a single section cylindrically curved on other horizontal axes parallel to the planes of said face, a third 25% of said concavities each having a single section cylindrically curved on other vertical axes parallel to the plane, of said face, and a fourth 25% of said concavities recessed within the plane of said face and having four other sections alternately cylindrically curved on mutually perpendicular further horizontal and vertical axes parallel to the plane of said face.

10. A projection screen as defined in claim 9, wherein said first 25% of the concavities alternate with said second 25% of the concavities in a first of said rows, while the third 25% and fourth 25% of the concavities alternate with each other in a second of said rows said first and second rows alternating over said face of said screen.

* * * * *